(12) United States Patent
Götz et al.

(10) Patent No.: US 10,505,439 B2
(45) Date of Patent: Dec. 10, 2019

(54) INVERTER FOR AN ELECTRIC AUTOMOBILE

(71) Applicant: Dr. Ing. h.c. F. Porsche Aktiengesellschaft, Stuttgart (DE)

(72) Inventors: Stefan Götz, Forstern (DE); Till Lütje, Stuttgart (DE)

(73) Assignee: Dr. Ing. h.c. F. Porsche Aktiengesellschaft (DE)

( * ) Notice: Subject to any disclaimer, the term of this patent is extended or adjusted under 35 U.S.C. 154(b) by 0 days.

(21) Appl. No.: 16/138,203

(22) Filed: Sep. 21, 2018

(65) Prior Publication Data

US 2019/0106002 A1    Apr. 11, 2019

(30) Foreign Application Priority Data

Oct. 9, 2017   (DE) ................. 10 2017 123 348

(51) Int. Cl.
| | |
|---|---|
| *H02J 7/00* | (2006.01) |
| *H02M 1/32* | (2007.01) |
| *B60L 50/51* | (2019.01) |
| *B60L 53/22* | (2019.01) |
| *H02P 29/024* | (2016.01) |

(52) U.S. Cl.
CPC .............. *H02M 1/32* (2013.01); *B60L 50/51* (2019.02); *B60L 53/22* (2019.02); *H02P 29/0241* (2016.02); *B60L 2210/42* (2013.01); *B60L 2210/44* (2013.01)

(58) Field of Classification Search
CPC ....................................................... H02M 1/32
USPC ........................................................ 320/109
See application file for complete search history.

(56) References Cited

U.S. PATENT DOCUMENTS

| | | |
|---|---|---|
| 5,687,066 A | 11/1997 | Cook |
| 8,030,884 B2 | 10/2011 | King et al. |
| 8,988,034 B2 | 3/2015 | Kopken et al. |
| 9,899,950 B2 | 2/2018 | Rechberger et al. |
| 10,029,669 B2 | 7/2018 | Mao et al. |

(Continued)

FOREIGN PATENT DOCUMENTS

| | | |
|---|---|---|
| DE | 4107391 A1 | 9/1992 |
| DE | 4431929 C1 | 10/1995 |

(Continued)

OTHER PUBLICATIONS

Konduktive Ladesysteme für Elektrofahrzeuge—Teil 23: Gleichstromladestationen für Elektrofahrzeuge, Norm DIN EN 61851-23, Nov. 2014, 43 pages.

(Continued)

*Primary Examiner* — Yalkew Fantu
(74) *Attorney, Agent, or Firm* — RatnerPrestia

(57) ABSTRACT

An inverter for an electric automobile having the following features: the inverter is configured to be connected at one end to a traction battery of the electric automobile and at the other end to a three-phase motor of the electric automobile; the inverter is configured to charge the traction battery if a star point of the three-phase motor is connected to a charging station; and the inverter comprises low-voltage-side switches for interrupting the charging if an operating limit of the inverter is exceeded. The invention furthermore provides a corresponding electric automobile.

20 Claims, 9 Drawing Sheets

(56) References Cited

U.S. PATENT DOCUMENTS

| | | | | |
|---|---|---|---|---|
| 2004/0178756 A1* | 9/2004 | Zhenxing | ................ | B60K 6/48 318/432 |
| 2009/0230917 A1* | 9/2009 | Kojima | .................. | B60L 58/10 320/101 |
| 2010/0019723 A1* | 1/2010 | Ichikawa | .............. | B60L 15/007 320/109 |
| 2011/0169449 A1* | 7/2011 | King | ..................... | B60L 15/007 320/109 |
| 2012/0112702 A1* | 5/2012 | Steigerwald | .......... | B60L 3/0069 320/137 |
| 2012/0280655 A1* | 11/2012 | Schneider | ............... | B60L 53/53 320/109 |
| 2013/0020993 A1* | 1/2013 | Taddeo | ................. | H02J 7/0027 320/109 |
| 2013/0187446 A1 | 7/2013 | Ferrel et al. | | |
| 2014/0049215 A1 | 2/2014 | Fassnacht | | |
| 2016/0001664 A1 | 1/2016 | Roth | | |
| 2017/0126165 A1 | 5/2017 | Rechberger et al. | | |
| 2017/0305274 A1 | 10/2017 | Saha et al. | | |

FOREIGN PATENT DOCUMENTS

| | | |
|---|---|---|
| DE | 102010042328 A1 | 4/2012 |
| DE | 102011017274 B4 | 7/2015 |
| DE | 102014109430 A1 | 1/2016 |
| DE | 102014220033 A1 | 4/2016 |
| DE | 102015013875 A1 | 5/2017 |
| DE | 102016121015 A1 | 5/2017 |
| DE | 112015004320 T5 | 7/2017 |
| EP | 2548757 A1 | 1/2013 |
| EP | 2676350 B1 | 11/2018 |
| JP | 2000209868 A | 7/2000 |
| JP | 2003088093 A | 3/2003 |
| JP | 2016106511 A | 6/2016 |
| JP | 2016220309 A | 12/2016 |

OTHER PUBLICATIONS

Straßenfahrzeuge—Kommunikationsschnittsteele zwischen Fahrzeug und Ladestation—Teil 1: Allgemeine Informationen und Festlegungen der Anwendungsfälle, 2015, Norm DIN EN ISO 15118-1, 23 pages.

Road Vehicles—Vehicle to grid Communication Interface—Part 3: Physical and Data Link Layer Requirements, NORM DIN EN ISO 15118-3, 2016, 22 pages.

Notice of Reasons for Refusal for Japanese Application No. 2018-189890, dated Oct. 2, 2019, 1 page.

* cited by examiner

INVERTER FOR AN ELECTRIC AUTOMOBILE

FIELD OF THE INVENTION

The present invention relates to an inverter for an electric automobile. The present invention furthermore relates to a corresponding electric automobile.

CROSS-REFERENCE TO RELATED APPLICATION

This application claims priority to German Patent Application No. DE 10 2017 123 348.2, filed Oct. 9, 2017, which is incorporated by reference herein in its entirety.

BACKGROUND OF THE INVENTION

In electrical engineering, the term charging station denotes any stationary apparatus or electrical installation which serves to feed energy to mobile rechargeable battery-operated devices, machines or motor vehicles by simple positioning or plugging-in, without having to remove the energy storage element—for instance the traction battery of an electric automobile. Charging stations for electric automobiles are colloquially also referred to as "electricity charging stations" and can comprise a plurality of charging points, which are characterized as "charging columns" depending on the design.

Known systems here include in particular direct current (DC)-based rapid charging systems (high performance charging, HPC), such as the so-called combined charging system (CCS) widely used in Europe. In direct-current charging of the generic type, direct current is fed from the charging column directly into the vehicle and, for this purpose, is provided from the electricity grid by means of a powerful rectifier or at solar charging stations by means of large buffer rechargeable batteries. Situated in the vehicle there is a battery management system that communicates with the charging column in order to adapt the current intensity or to end the process when a capacity limit is reached.

According to the prior art, the power electronics required for this purpose are usually integrated in the charging column and have a loading capacity up to a power limit of 50 kW. Since the direct-current connections of the charging column are directly connected to corresponding connections of the traction battery, high charging currents can thus be transmitted with low losses, which enables short charging times.

However, modern electric high-performance vehicles and utility vehicles use voltages for their drive systems which sometimes are far above the output voltages of typical fast charging columns of often less than 400 V. In order nevertheless to be able to charge at existing fast charging columns, it is necessary to carry out a DC voltage conversion that raises the voltage of the charging column for example from 400 V to 800 V for the vehicle battery.

Said DC voltage conversion can be performed by a dedicated DC-DC converter, although this is expensive on account of the high power required, occupies a large structural space and significantly increases the vehicle weight, as a result of which the range is adversely affected.

US2004178756A, US2009230917A and US2013187446A, all of which are incorporated by reference herein, for instance, each disclose an electric vehicle battery safety system having a DC-DC converter. The respective system is configured to ascertain whether a limit value has been reached: a voltage limit is ascertained in the case of US2004178756A and US2009230917A, and a temperature limit in the case of US2013187446A.

US2017126165A, which is incorporated by reference herein, likewise relates to an electric vehicle battery safety system having a power converter. This system comprises a current and voltage sensor in order to ascertain whether a limit value has been reached and specific low-voltage-side switches are blocked.

U.S. Pat. No. 5,687,066A, which is incorporated by reference herein, discusses an electric vehicle battery safety system having a DC-DC converter, which system comprises a temperature sensor in order to ascertain whether a limit value has been reached.

Alternatively, the drive inverter of the vehicle can be used as a DC-DC converter. In this case, the conversion is effected via the phase inductance of the electric machine (from phase to star point). A major problem in the use of the drive inverter and the machine is the superimposed alternating current (ripple current) that arises on account of the often low machine phase inductance and the low possible switching rate of the slow insulated-gate bipolar transistors (IGBTs) used in vehicles. This current and voltage ripple in the case of the very high charging powers of present-day vehicles (100-500 kW, corresponding to the power supply of a village) generates strong electromagnetic interference in many sensitive electronic systems in the vehicle and causes increased energy losses accompanied by heating.

SUMMARY OF THE INVENTION

The invention provides an inverter for an electric automobile and a corresponding electric automobile as claimed in the independent claims.

The approach according to aspects of the invention is based on the insight that the positive pole of a direct-current charging column can be connected to the brought-out star point of the electric machine. Meanwhile the negative pole of the charging column is connected to the negative potential of the high-voltage battery (HV battery).

With the aid of the phase inductances of the electric machine and by means of suitable driving of the semiconductor elements of the inverter, the latter can thus as it were be repurposed as the step-up converter, boost converter or step-up controller. By virtue of the fact that said boost converter converts the lower voltage of the charging column into the voltage of the HV battery, it becomes possible to charge the high-voltage battery at a conventional charging column without the use of additional charging electronics (such as e.g. a further DC-DC converter).

The complicated driving of the phases and the high current and voltage ripple increase the operating risks during the charging process. A safety structure that takes account of all eventualities is indispensable for the protection of the user and component parts.

One advantage of the proposed solution resides in the creation of such a safety structure which ensures proper operation during the charging process and automatically intervenes in the case of current, voltage or temperature being exceeded.

Further advantageous configurations of the invention are specified in the dependent patent claims.

BRIEF DESCRIPTION OF THE DRAWINGS

One exemplary embodiment of the invention is illustrated in the drawings and is described in greater detail below.

DETAILED DESCRIPTION OF THE INVENTION

Figure 1:
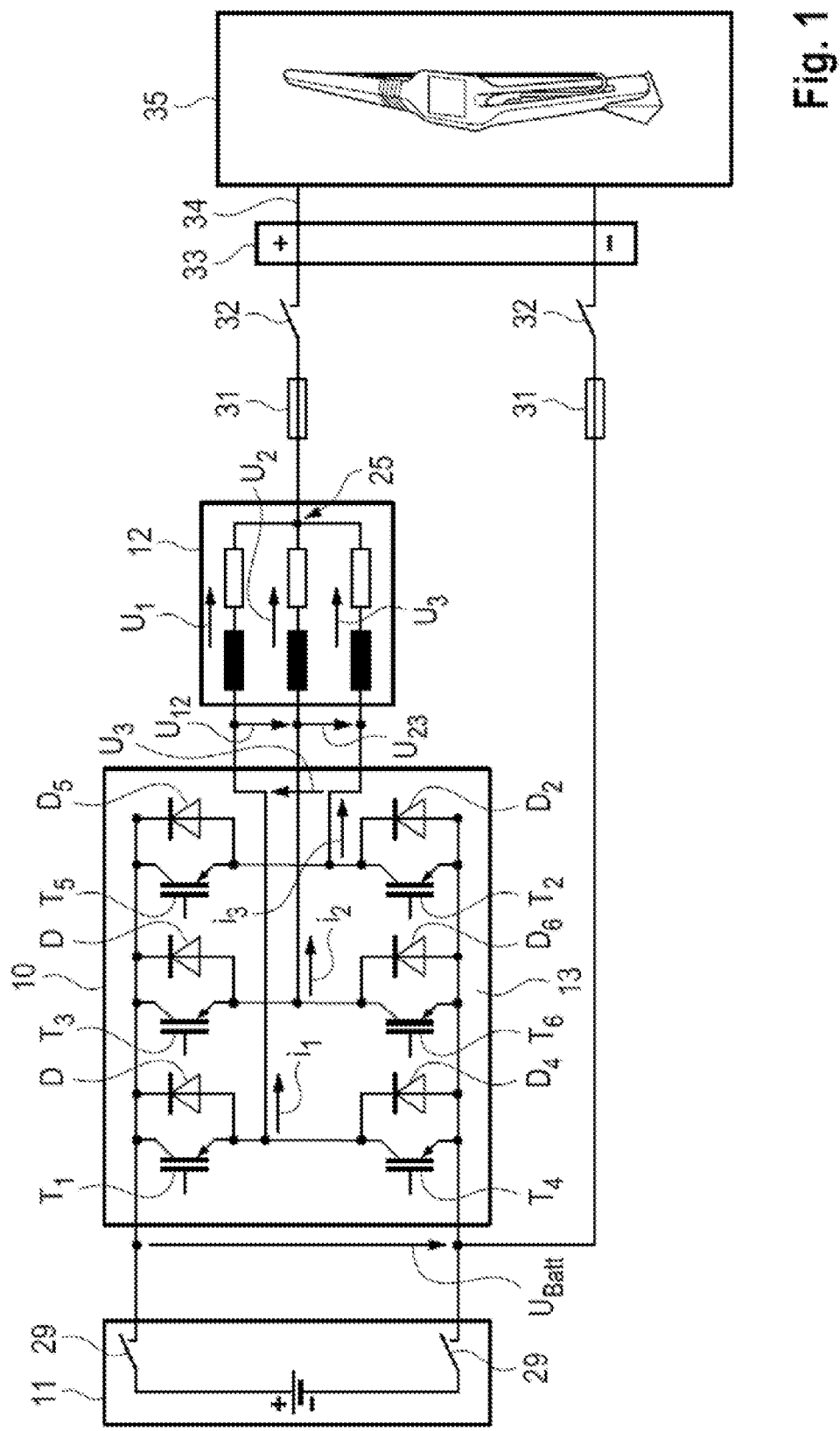
FIG. 1 shows the schematic construction of an electric drivetrain.

FIG. 1 illustrates the schematic construction of a drivetrain incorporated in the electric vehicle and comprising a high-voltage traction battery (11), in which battery contactors (29) controlled by the battery itself are integrated. The vehicle furthermore comprises an inverter (10) having at least three phases, which converts the DC voltage of the traction battery (11) into three-phase AC voltage, and a three-phase motor (12) for converting the electrical energy into mechanical energy that leads to the movement of the vehicle.

The star point (25) of the three-phase motor (12), said star point being identified in the drawing, can be used as access to create boost converter that acts counter to the energy flow direction during traveling operation. In this case, the phase inductance of the three-phase motor (12) functions as boost inductance of the DC-DC converter. Usually, said star point (25) in three-phase motors is neither accessible nor electrically contactable, but in the present vehicle is deliberately brought out of the housing of the three-phase motor (12) and connected to a 400 V DC charging station (35) via a charging socket (33) with optional fuse (31).

The safety architecture is based on the following input criteria, preferably monitored in terms of hardware: an AC and DC current limit, a DC voltage limit at the output of the link circuit of the inverter (10) to the traction battery (11), and an optional signal of the battery contactors (29) for the case where the traction battery (11) is disconnected from the inverter (10). Furthermore, it is possible to provide a temperature limit and additional limits for current and voltage that are narrower or derived mathematically from current signals.

A hardware implementation or an implementation in a hardware circuit is present in particular by virtue of a digital or analog-electronic circuit that does not allow programming with software.

Possible fault reactions comprise blocking the low-side switches (13), activating an active discharge and reducing the current excitation via the duty cycle or duty factor of the low-side switches (13). In the present context, the term low-voltage side (low side) always denotes the lower side of the circuit in accordance with the drawing, said lower side being identified by the reference sign 13 in FIG. 1.

In the case where the operating limits monitored in terms of hardware are exceeded, operation (at least of the relevant phase) has to be directly interrupted.

If the low-side transistor of individual or all phases of the inverter (10) is blocked, i.e. the latter are prevented from being switched on, the current is not conducted further into the inductance $L_{em}$ of the electric machine and increased, but rather discharges slowly at the rate $$\frac{dI}{dt} = \frac{V_{in} - V_{out}}{L_{em}}.$$

The low-side switches (13) can be blocked in diverse ways in terms of hardware: the voltage supply—for example with 12 V, 15 V or 20 V—of the driving electronics of the corresponding low-side switch (13)—for instance of the gate driver in the case of a field effect transistor—can be disconnected upon the limit being exceeded. The disconnection can preferably be effected by a circuit that exhibits a normally off behavior, that is to say requires from the circuit that checks the limits an explicit enable in order to provide the supply voltage for the driving.

Alternatively, the control signal for the gate driver is obtained with the aid of a logic circuit, for example an AND gate, that combines the on command with an enable signal of the circuit that checks the safety limits.

In the case of limit exceedances that occur in only one phase, for example an exceedance of the current limit in the AC current sensor of one phase, as an alternative to blocking the low-side switches (13) of all phases it is also possible to block only the low-side switch (13) of the corresponding phase. If power is subsequently distributed among the other phases such that the limits thereof are likewise exceeded, they are correspondingly switched off as soon as the exceedance is identified.

The task of the AC current sensors in inverters normally consists in measuring the phase current of the connected three-phase motor (12) for closed-loop control. DC current sensors can additionally be provided in order to measure for example the power inflow during motor operation.

In many drive inverters, given n phases only n−1 AC phase current sensors are implemented. In this case, the phases can be directly monitored by a dedicated sensor, while the current intensity in the remaining phase is determined via either the value measured by the DC current sensor or the difference between the AC current sensor values and the DC current.

If an AC current sensor is present for each phase, by contrast it is possible to dispense with a DC current sensor, in principle. However, an additional current sensor increases safety as a result of redundancy and furthermore allows the correction of measurement errors.

The DC value also indicates the total current of all the phases. It can furthermore be used to indicate a fault if it does not correspond to the sum of the phase currents within a specific accuracy.

Possible fault cases within the meaning of the invention that trigger a reaction are the following, for example: measurement inconsistency: values of redundant current and/or voltage sensors contradict one another or an expected relationship (for example Kirchhoff's laws) by more than a predefined value and/or percentage proportion (implementation preferably via at least hardware monitoring and reaction).

Detection of implausible, for example unphysical, values (e.g. high noise).

Detection of a failure of sensors (implementation preferably via at least hardware monitoring and reaction).

Loss of communication between the vehicle and the charging column.

Exceedance of predefined limit values (voltage, current, temperature) (implementation preferably via at least hardware monitoring and reaction with, if appropriate, additional soft limits, for example in software).

Triggering of a plug-off identification.

Loss of communication between the control system of the inverter and the superordinate vehicle control system, which preferably communicates with the control system of the inverter via a bus.

Triggering of a timeout for example of the signal receiving unit or of the communication receiving unit of the inverter.

Triggering of a watchdog mechanism of the inverter control system indicating a crash of the control system.

Detection of an opening of at least one contactor during the charging process (implementation preferably via at least hardware monitoring and reaction).

In accordance with the drawing, low-side switches (13) embodied as an IGBT with freewheeling diode are responsible for the flowing of the input current in two winding inductances of the three-phase motor (12). The blocking of one of these switches (13) thus prevents the transfer of energy to the corresponding phase. In this case, however, the energy already situated in the inductances has to be dissipated into the traction battery (11) or—for instance in the case of open battery contactors (29)—be actively discharged.

Figure 2:
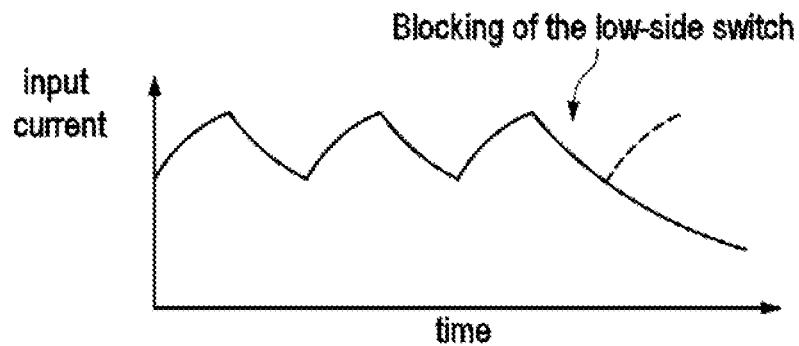
FIG. 2 shows a first temporal profile of a charging current.

FIG. 2 illustrates the profile of the inductance current upon the blocking of the low-side switch (13) during a phase in which the low-side switch (13) is turned off. At this time current flows through the freewheeling diode or via the so-called high side to the output. No change in the current profile directly arises in this case. However, the low-side switch (13) is no longer unlatched and no further current is conducted into the relevant inductance, as a result of which the current fails further toward zero. The hypothetical current profile without blocking is indicated in a dashed manner.

Figure 3:
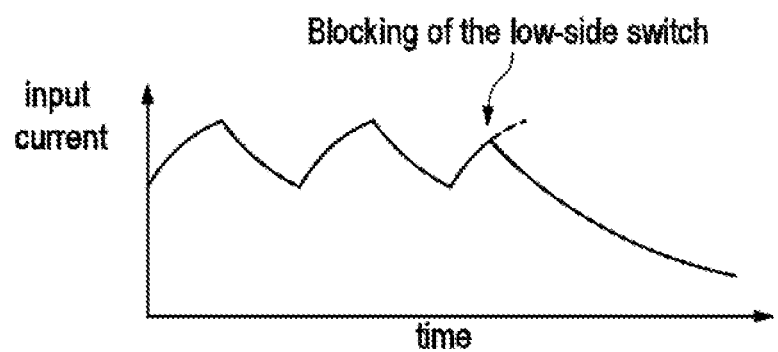
FIG. 3 shows a second temporal profile of the charging current.

If by contrast—as illustrated in FIG. 3—the low-side switch (13) is blocked while it is closed, further charging is immediately stopped and the current and the associated energy of the inductance discharge with an approximately exponentially failing profile into the output.

Figure 4:
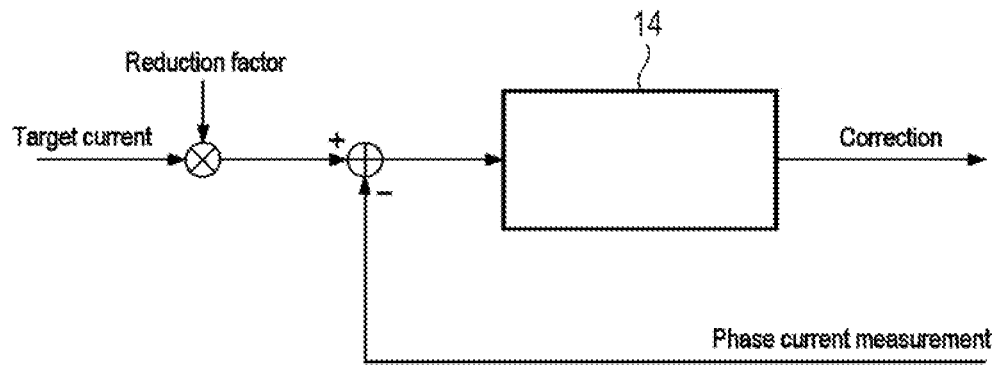
FIG. 4 shows part of a first control loop according to aspects of the invention.
Figure 5:
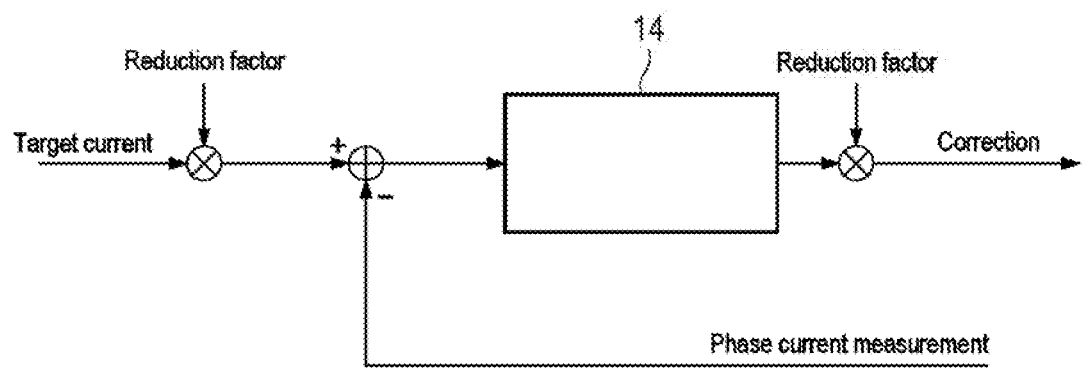
FIG. 5 shows part of a second control loop according to aspects of the invention.

FIGS. 4 and 5 schematically depict exemplary implementations of the downward control of one or more currents. If specific phase currents must be reduced in the fault case, the current control target of a corresponding controller (14) can be reduced for example by an absolute value or by a factor—see FIG. 4.

Since the control loop has a relatively long reaction time since the control error must first pass through the controller (14), embodied for example in proportional-integral (PI) fashion, and often accumulate over some time, it is possible for example in the same ratio likewise to reduce the output of the controller (14)—see FIG. 5 —, which usually controls the relative switched-on duration of the switch (13).

If the downward control is effected by a controller (14) on an integrated circuit without the output of said controller being reduced, an additional current limit should be implemented, which blocks the associated low-side switch(es) (13).

Alternatively (although not preferred), corresponding closed-loop control can be brought about by locking the on signal of the relevant low-side switches (13) for a specific time in order to effect delay for a specific time or to enable only a portion of the on signals (for example only every second or third signal) for a specific time.

Since the blocking of one or more low-side switches (13) can indeed prevent the subsequent charging of further energy into the associated inductances of the three-phase motor (12), but the energy already stored magnetically in the inductances must nevertheless be discharged into the output, hence into the link circuit capacitor or the traction battery (11), a device is required which, in the case of an emergency or fault, can safely discharge said energy, preferably convert it into heat.

Figure 6:
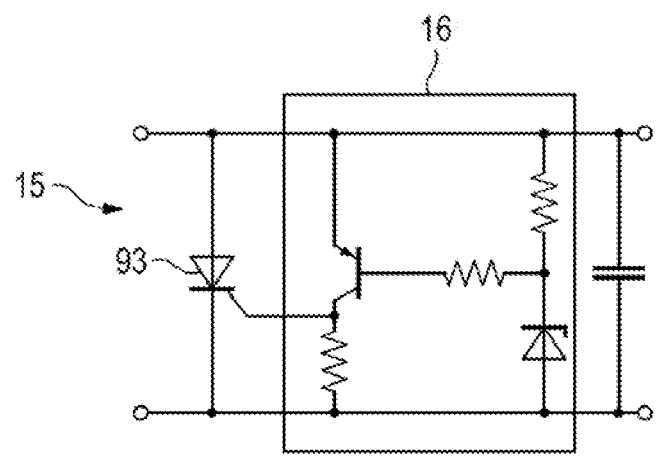
FIG. 6 shows a crowbar circuit for overvoltage protection.
Figure 7:
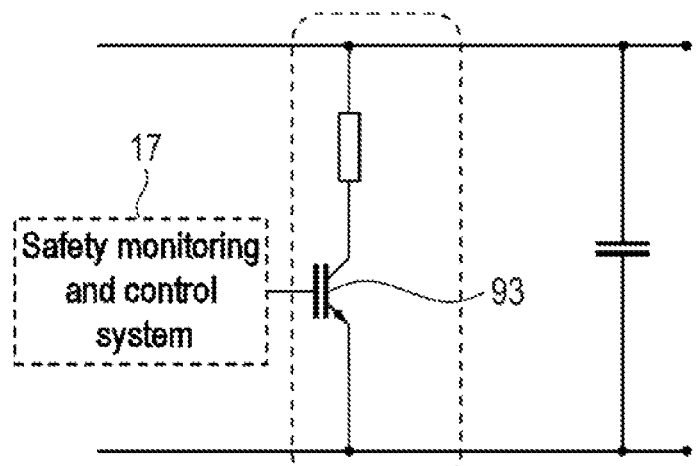
FIG. 7 shows an electronically controlled discharge device.

In particular, with open battery contactors (29) a traction battery (11) taking up energy is no longer connected to the inverter (10) and the link circuit capacitor would be the only storage element that could brake a rapid voltage rise. The energy in the inductances of the three-phase motor (12)

$$\tfrac{1}{2}\Sigma_j L_j i_j^2(t)$$

for the inverter phases or machine phases j may however significantly exceed the energy still able to be stored at the present charging voltage $V_{pres.}$ $$\tfrac{1}{2}C(V_{tolmax}-V_{pres.})^2$$

until the maximum tolerable voltage $V_{tolmax}$ is reached. If this is the case, it is necessary to use an active discharge device (15) in the context of the invention, as is represented in FIGS. 6 and 7.

The activation of the active discharging (in hardware without software in the decision loop, i.e. generally by a digital or analog-electronic circuit that does not allow programming with software) shall be effected in particular if the DC voltage exceeds a limit value set or optionally upon the identification of open battery contactors (29) for example on the basis of a signal of the traction battery (11).

The active discharge device (15) preferably comprises an electrically activatable (normally off) or preferably deactivatable (normally on) switch (93), by which the positive and negative poles of the link circuit capacitor are conductively connected via an optional, but advantageous discharge resistor. FIG. 6 shows by way of example a corresponding crowbar circuit having a thyristor as switch (93), no separate resistor and an exemplary hardware overvoltage detector (16). FIG. 7 illustrates the alternative of an electronic safety monitoring and control system (17), which besides the active discharging should simultaneously control the blocking of the low-side switches (13).

Preferably, a plurality of current limits are implemented: upon the exceedance of a first limit ("inner current limit") the relevant current is controlled downward, while the exceedance of a second limit ("outer current limit") blocks the associated low-side switch(es) (13). This procedure proves to be expedient for the case where the monitoring of the inner current limit has failed, does not take effect or is insufficient.

Figure 8:
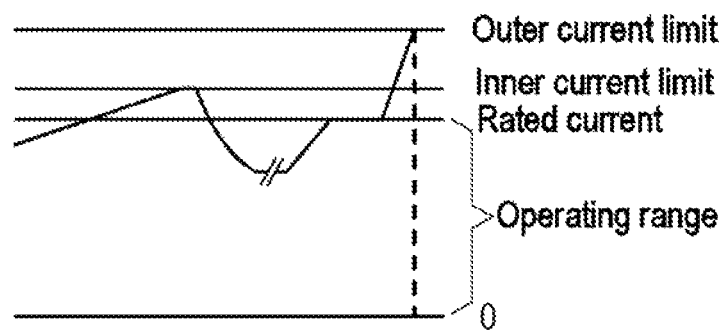
FIG. 8 shows a third temporal profile of the charging current.

An exceedance of the inner limit only reduces the current and does not completely stop the conversion of the associated phase(s), as would be done by the outer limit by blocking low-side switches (13). The inner limit is lower than the outer limit. Preferably, both are implemented in hardware. At least the outer limit is implemented purely in hardware. An exemplary behavior for a current that reaches the inner limit and is reduced can be gathered from FIG. 8; upon the outer limit being reached, operation is stopped at least for the time being.

One risk to be prevented is the possible overloading of the power transistors or of the motor winding, which may be caused by an unbalance of the individual currents through the phases—by way of example, one phase carries significantly more current than the other phase on account of different inductances of the machine —, a short circuit in the electric machine winding with the consequence of a reduction of the effective inductance or the reduction of the inductance as a result of alteration of the rotor position—particularly in the case of a three-phase motor (12) having permanent magnets in the rotor.

Figure 9:
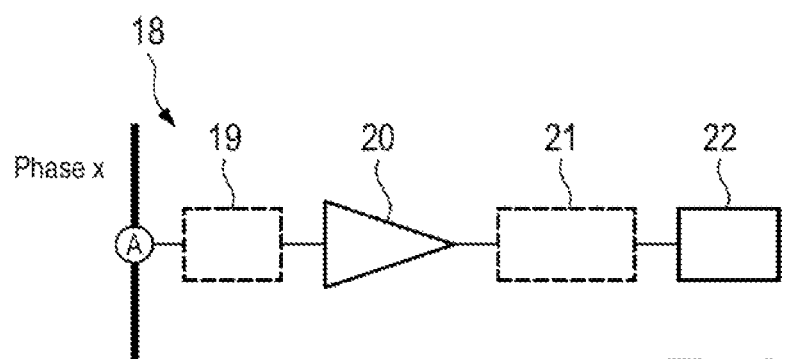
FIG. 9 schematically shows the threshold value switch of a current sensor.

Each AC and DC current sensor of the inverter (10) is therefore equipped with a threshold value switch (18), the schematic construction of which for one phase can be discerned in FIG. 9.

The digital input (22) of the threshold value switches (18) triggers upon any fault current and opens the charging contactors (32—FIG. 1), prevents an activation of the relevant low-side switches (13) for example by a logic gate (AND) that prevents the switching signals from being forwarded unless an appropriate signal of the current limit monitoring system is simultaneously present, or disconnects the supply voltage of the corresponding low-side gate drivers.

Besides complete switching-off of all the low-side switches (13), for the alternating-current sensors (24) there is additionally the possibility of implementing phase-by-phase switching-off. Interference and otherwise undesired portions of the measured current can optionally be reduced on the input side of an amplifier (20) or voltage divider by means of a filter (19).

Furthermore, an optional Schmitt trigger (21) can enable the low-side switches (13) to be automatically switched on again, but at the same time can prevent them from oscillating.

Figure 10:
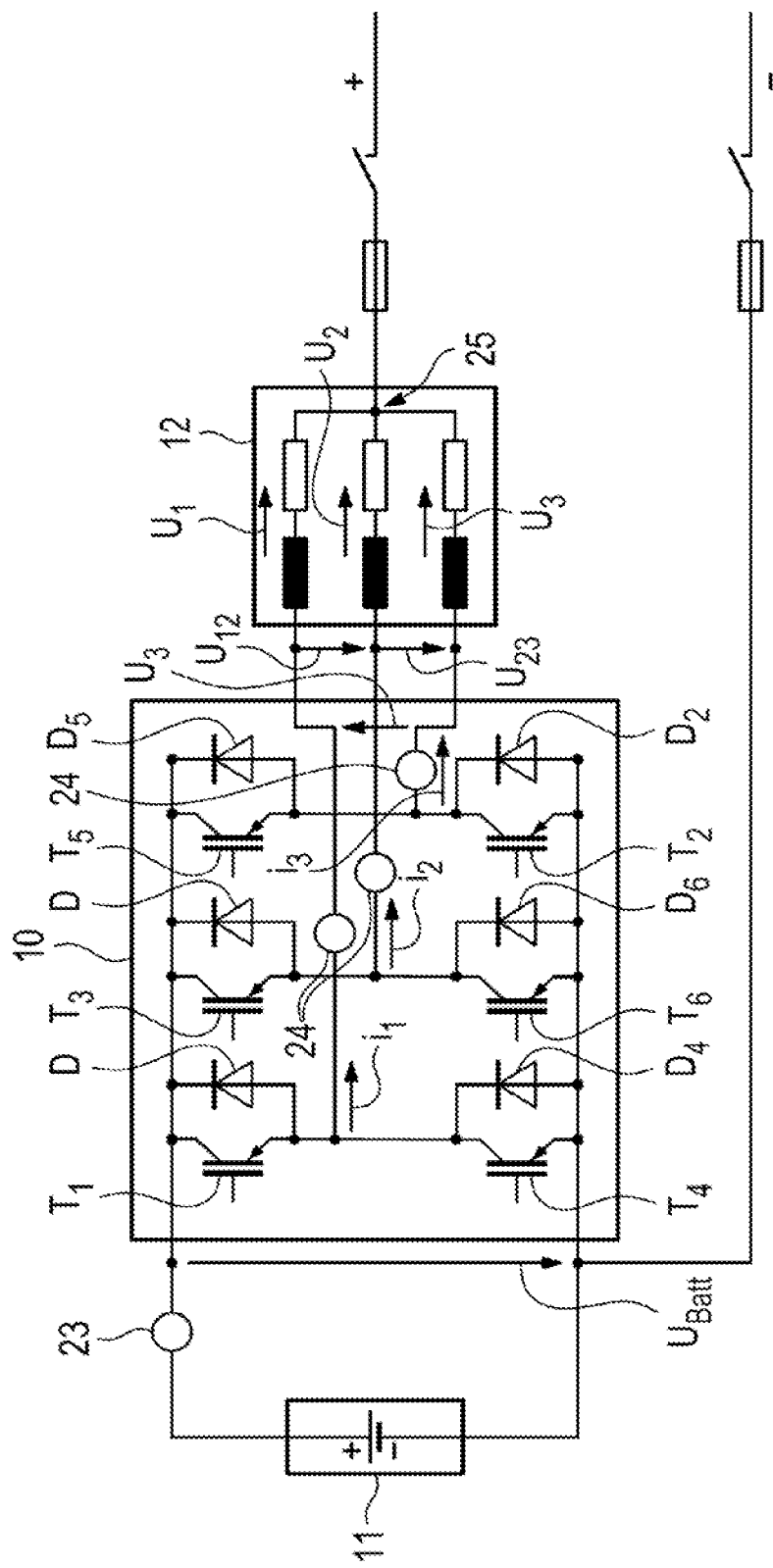
FIG. 10 shows the construction of a drivetrain with current sensors.

FIG. 10 highlights optional equipment for redundancy with three alternating-current sensors (24) and one direct-current sensor (23). It goes without saying that, in accordance with a minimum equipment alternative, just two alternating-current sensors (24) and one direct-current sensor (23) or exclusively three alternating-current sensors (24) may be provided, without departing from the scope of the invention.

A circuit of this type presupposes that the alternating-current sensors (24) can measure DC, which rules out purely inductive sensors, for example. In this case, the bandwidth of the alternating-current sensors (24) preferably corresponds at least to the switching rate of, for example, 12 kHz to 25 kHz in the case of IGBT power switches or 40 kHz to 100 kHz in the case of wide band gap power semiconductors, for example transistors composed of gallium nitride (GaN) or silicon carbide (SiC). The threshold for triggering the digital input can be set differently for alternating-current sensors (24) and direct-current sensors (23).

One risk to be prevented is moreover the sudden disconnection of the traction battery (11) for example on account of faults without information of the inverter (10). In this case, a continued charging current flow leads to an almost abrupt rise in the voltage since only the present link circuit capacitance of approximately 1 mF can take up the current. Damage to the traction battery (11), sudden load shedding of cooling compressor or other large consumers of the traction battery (11), faults or the "runaway" of the closed-loop control constitute further risks that need to be prevented.

Figure 11:
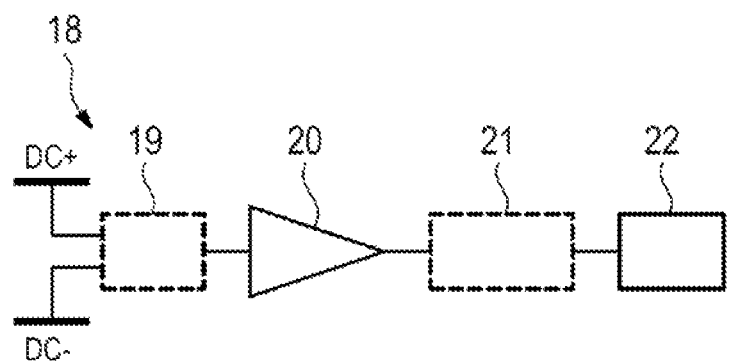
FIG. 11 shows the threshold value switch of a voltage sensor.

As an implementation possibility, the DC voltage sensor of the link circuit of the inverter (10) is equipped with a threshold value switch (18), the schematic construction of which for one phase can be seen in FIG. 11. The digital input (22) of the threshold value switch (18) triggers upon a fault voltage and provides for the disconnection of the supply voltage of the low side. The measured voltage can optionally be filtered on the input side of the amplifier (20) or voltage divider. Furthermore, an optional Schmitt trigger (21) can result in the low side being automatically switched on again.

Besides the monitoring of the electrical rated variables of the inverter (10), a thermal monitoring preferably takes place in addition. In the event of overtemperatures of power semiconductors or other central elements of the inverter (10), the low side is immediately switched off in this case, such that operation is possible only within the specified temperatures. Damage to components of the inverter (10) during its operation is prevented as a result.

Figure 12:
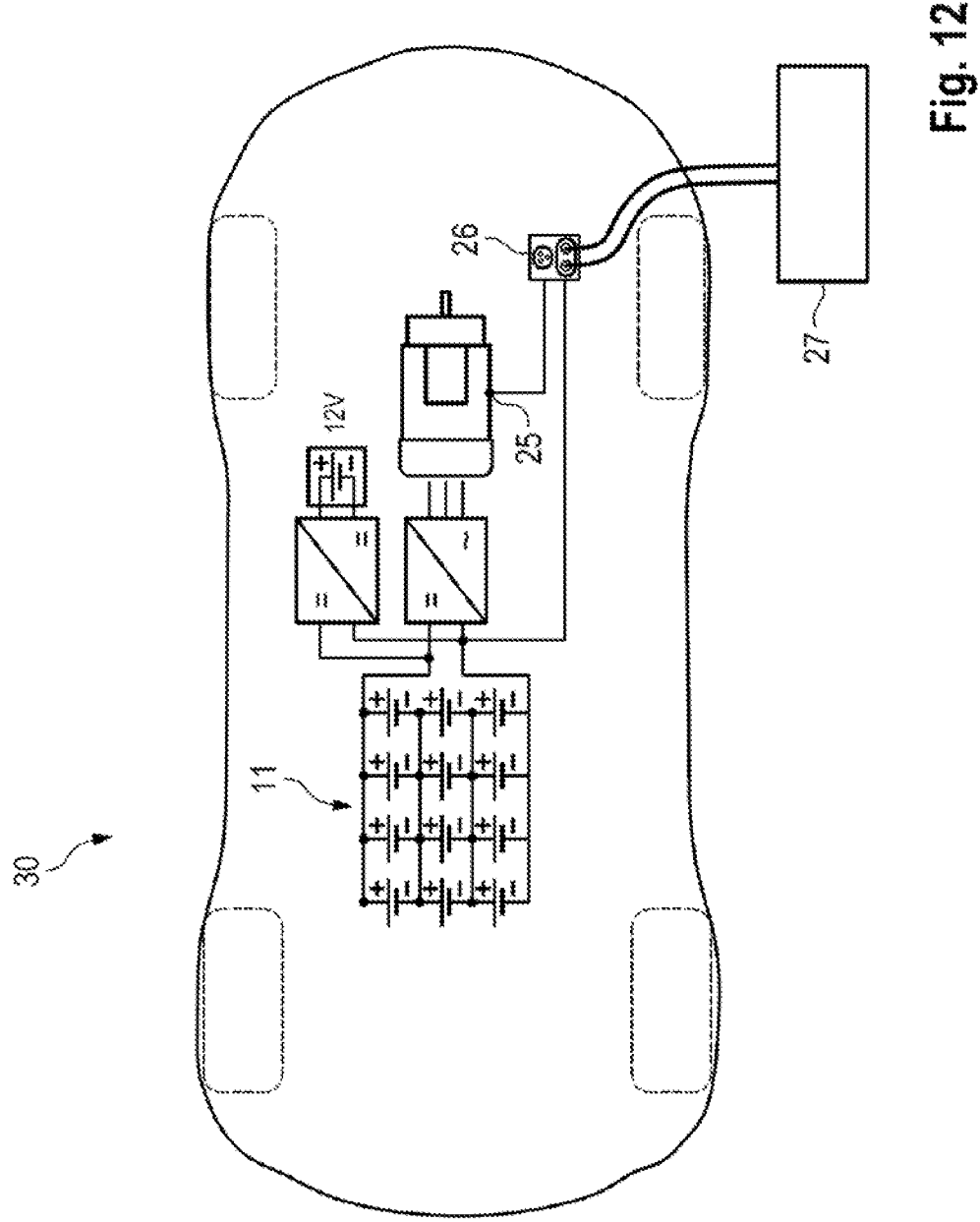
FIG. 12 shows a first electric automobile connected to a charging column.

FIG. 12 shows by way of example an electric automobile (30) in boost operation, said electric automobile being connected to a charging column (27) by means of a charging socket (26). Upon the opening—not necessarily caused by boost operation—of the battery contactors (29) by the electric automobile (30), the traction battery (11) is no longer connected to the HV circuit and thus to the inverter (10). Upon further introduction of current into the HV circuit by virtue of the boost operation according to aspects of the invention of the inverter (10), only the link circuit capacitance curbs the voltage rise, the time derivative of which thus satisfies the equation $$\frac{dV}{dt} = \frac{I}{C}.$$

This case should likewise be identified by a rapidly rising DC voltage in boost operation. A corresponding signal of the battery contractors (29) is advantageous in order directly to stop boost operation upon the opening of said contactors.

While rules for switching-off in terms of hardware should exist in accordance with the invention in order to ensure that switching-off or other control definitely takes place, in an alternative embodiment it is possible to implement rules that are parameterizable in terms of software or even rules that are variable automatically at the runtime. The rules can thus be made significantly more complex and contain for example equations and operations that cannot be implemented simply by analog electronics.

In general, the software rules are chosen more conservatively, while the hardware switching-off rules can be orientated toward maximum toleratable limit values, since it can be assumed that as a rule a software rule had already been applicable earlier. The hardware limits are reached in this case only if at least one software rule was not applied for fault reasons.

Under certain circumstances, after a triggering of the safety rules and the corresponding reaction, a return to the previous state can take place. With the use of Schmitt triggers (21) upon the activation of the reaction, the return to normal operation can be made possible with distinct undershooting of the triggering limit value. However, this solution is of interest primarily for mere downward control of the current. If an overvoltage or open battery contactors (29) were triggers, there is the risk of no traction battery (11)

being connected which might take up energy. Accordingly, an enable should be effected only after the elimination of the cause and should entail a slow start with a low current (as is also customary upon initial start-up of charging operation after plugging).

Before a return to normal operation, after the critical range has been left there is a wait until a so-called dead time has elapsed. The number of instances of switching on again can be limited by means of shift registers, for example, in order to prevent repeated switching-off and return if the actual fault persists; e.g. a complete reset of the control system (17) is then necessary.

In the case of switching-off in terms of hardware, a simultaneous signal to an integrated circuit (IC) that can cancel the blocking is recommended. It is necessary to prevent the inadvertent cancelation by a faulty IC or software, for example by means of additional dead time, two independent control ICs, both of which have to effect an activation, or three independent control ICs, at least two of which have to effect an enable.

Preferably, after each triggering of a hardware fault limit, in principle afterward the system begins with lower current and the latter is increased again only progressively. By way of example, it is possible to run through part of or the entire initialization loop with which the charging process was begun after plugging.

By way of example, in the software rules, in contrast to hardware, a model for determining the actually critical operating limits can be calculated relatively simply. In this regard, for instance, the actual background of limiting the current is preventing to overheating and destruction of the semiconductors. Besides high-side diodes, in particular low-side IGBTs or other transistors are taken into consideration.

The software limits can be defined more narrowly than the hardware limits and contain more complex formula relationships. In particular, otherwise inaccessible variables can be estimated from the measurement values.

By way of example, it is possible to calculate the temperature T of the semiconductor to a first order in accordance with the following relationship:

$$K_{T,1}(T(t) - T_U) + K_{T,2}\frac{dT(t)}{dt} = V_{ce}(i(t))i(t) + K_{E,1}f_{switch}i(t)$$

In this case, $K_{T,1}$ describes the thermal dissipation away from the semiconductor (surroundings, heat sink, etc.); $K_{T,2}$ describes the effective heat capacity, $V_{ce}$ is the current-dependent voltage drop across the semiconductor (from collector to emitter in the case of IGBTs) $K_{E,1}$, is a constant describing the switching losses, $f_{switch}$ is the switching rate, and i(t) is the current profile over time. The parameters K can be stored for example in a memory of a digital circuit, the current can be measured, the voltage drop can be approximated as a constant or stored as a look-up table depending on the current intensity, and the present switching frequency can be communicated by the control system (17) or be stored as a constant or parameter in the memory. The differential equation can be solved, for example, via the Euler method, the Crank-Nicholson method or suchlike by means of a digital circuit.

A corresponding software rule could then estimate the temperature on the basis of the above formula or a more accurate model. Upon a specific limit of the temperature being reached or exceeded, one of the fault reactions described can ensue.

The software rules can furthermore work predictively and take account of the future development of the temperature within a fixed time or preferably the maximum expected delay time until the planned reaction—for example the blocking of low-side switches (13) or the downward control of the phase current or total current. As a result, it is possible to react in an anticipatory manner in order to counteract the occurrence of a fault or to prevent the latter.

Accordingly, it is possible to estimate the temperature of semiconductors at a predefined future time or at a point in time after the known reaction times. For this purpose, expedient assumptions should be made, for instance the maintenance of the present current, linear continuation of the present current with the present gradient over time, use of the expected maximum current (to determine the worst case) or a periodic current profile through inclusion of the past cycles.

Limit values that can be checked in terms of hardware or software concern the current intensity $$I_{Max} = I_{rated} + \Delta I = 1.1 \cdot I_{rated} \text{ (where for example } \Delta I = 10\%(I_{rated}))$$

with the integral $$Q_{Max,external\ integral}[As] = \int_{t_0}^{t_1} I(t) \cdot dt = tbd \text{ where}$$

$$(dt = t_1 - t_0 = tbd\ s),$$

the DC voltage $$U_{Max} = U_{rated} + \Delta U = 1.1 \cdot U \text{ (where for example } \Delta U = 10\%(U_{rated}))$$

with the integral $$\Phi_{Max,voltage\ integral}[Wb] = \int_{t_0}^{t_1} U(t) \cdot dt = tbd \text{ where}$$

$$(dt = t_1 - t_0 = tbd\ s),$$

and the temperature $$T_{Max} = T_{rated} + \Delta T = 1.1 \cdot T_{rated} \text{ (where for example } \Delta T = 10\%(T_{rated}))$$

Integrals and derivatives can be implemented in analog hardware, for example.

Figure 13:
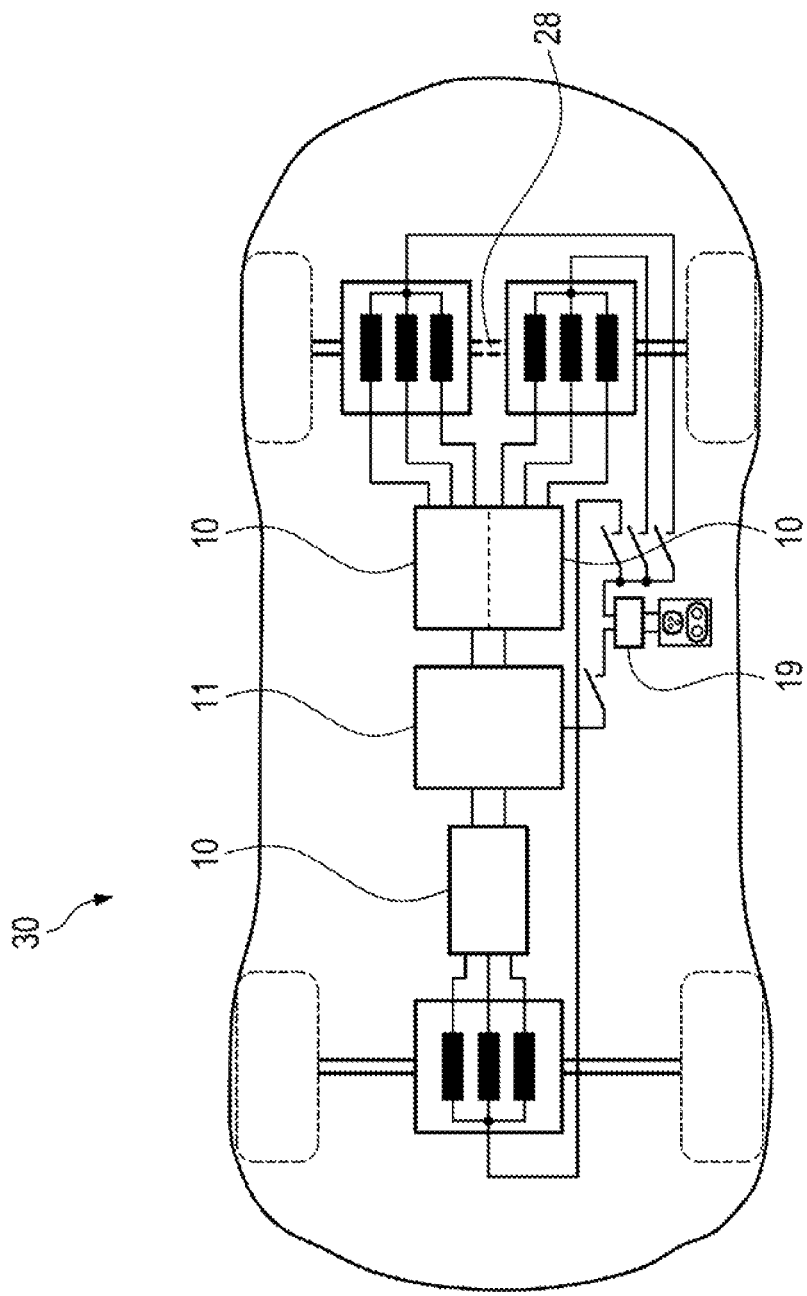
FIG. 13 shows a second electric automobile driven at both axles.
Figure 14:
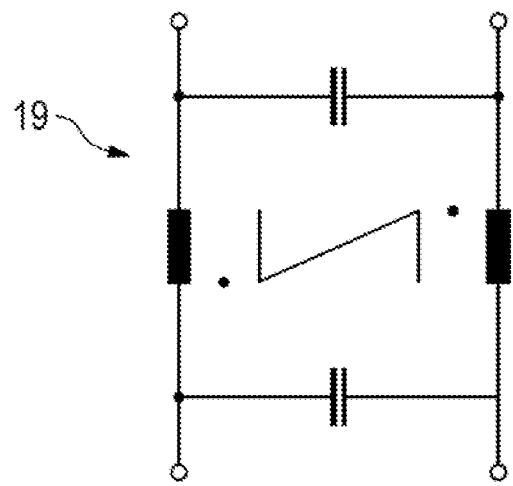
FIGS. 14 and 15 show alternative embodiments of a filter.
Figure 15:
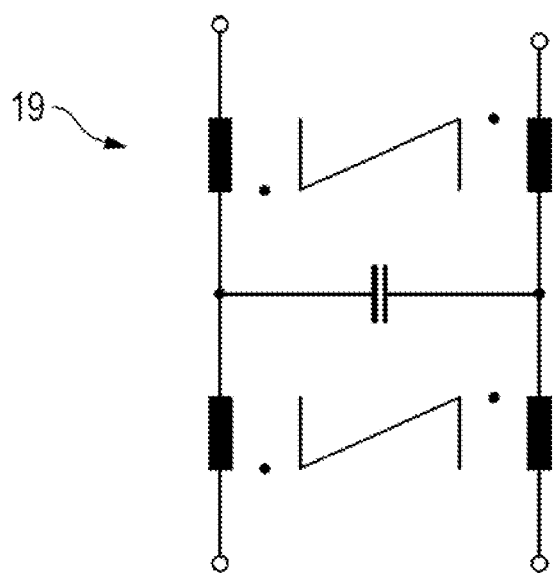

FIG. 13 shows, in joint consideration with FIGS. 14 and 15, optional circuit implementations with the use of two machines. In this case, the drive axle (28) can be connected or disconnected.

Besides the electrical and thermal monitoring of the system in accordance with the explanations above, a mechanical monitoring can additionally take place as well, in order to ensure that the rotor position of the electric machine changes by not more than a defined magnitude and torques building in the electric machine do not exceed a certain limit value, without eliciting a safety reaction. A magnetic field that arises in the stator during the charging process on account of the current flow through the stator windings of the electric machine could otherwise generate a torque in the rotor and possibly result in the rotor being oriented anew in the resultant magnetic field.

During the charging process this is undesired on account of possible noise formation and even more so on account of a mechanical coupling between electric machine and wheels. A change in the rotor position or a rotor speed or a torque building up in the rotor must therefore be identified and prevented by suitable measures. Preferably, for this purpose recourse is already had to existing sensor technology of the vehicle architecture (e.g. resolver/encoder/rotor position sensor).

If the rotor position changes within a defined time by a magnitude to be defined, it is necessary to react. The reaction can be effected for example in a current reduction by a specific value or in a specific ratio or by the switching-off (blocking of the transistor driving). By way of example, it is also possible to carry out a reduction of the current at a first limit and a switching-off at a second limit.

Here, too, it is possible to define soft and hard limits which can result in different measures.

Furthermore, it should be noted that, in the explanations above, the inverter phases are described by way of example with low-side and high-side switches. Since inverters of this type generally have freewheeling diodes, the DC-DC operation of an inverter within the meaning of the invention can nevertheless also be effected without activation of the high-side switches. This applies particularly to IGBTs, the conductivity of which—in contrast to MOSFETs—in the reverse direction, that is to say the forward direction of the diodes, does not increase when the gate is charged. This has major advantages in terms of safety engineering since, in this way, it is not possible for current to flow from the battery into the charging column for example in the event of control errors. Furthermore, short circuits to ground cannot occur. Such a DC-DC boost mode only with the low-side switches could be applied in reaction to specific faults, on the one hand, but also during control operation, on the other hand.

What is claimed is:

1. An inverter for an electric automobile, characterized by the following features:
    the inverter is configured to be connected at one end to at least one traction battery of the electric automobile and at the other end to at least one three-phase motor of the electric automobile,
    the inverter is configured to charge the at least one traction battery if a star point of the at least one three-phase motor is connected to a charging station, and
    the inverter comprises low-voltage-side switches for interrupting the charging if a predefined operating limit of the inverter is exceeded.

2. The inverter as claimed in claim 1, characterized by the following features:
    the inverter comprises current sensors for measuring phase currents of the three-phase motor, and
    the operating limit relates to the phase currents.

3. The inverter as claimed in claim 2, characterized by the following features:
    the inverter comprises controllers for controlling the phase currents, and
    the controllers are connected to the switches.

4. The inverter as claimed in claim 2, characterized by the following features:
    the inverter comprises a discharge device for discharging the three-phase motor, and
    the inverter is configured to activate the discharge device upon the operating limit being exceeded.

5. The inverter as claimed in claim 4, characterized by at least one of the following features:
    the discharge device comprises a hardware overvoltage detector or
    the discharge device comprises an electronic control system.

6. The inverter as claimed in claim 2, characterized by the following features:
    the current sensors comprise threshold value switches, and
    the threshold value switches each comprise a filter, an amplifier, a Schmitt trigger and a digital input.

7. The inverter as claimed in claim 2, characterized by at least one of the following features:
    the current sensors comprise a direct-current sensor, and
    the current sensors comprise alternating-current sensors.

8. An electric automobile, characterized by the following features:
    the electric automobile comprises an inverter as claimed in claim 1, a traction battery, and a three-phase motor, and
    the inverter is connected at one end to the traction battery and at the other end to the three-phase motor.

9. The electric automobile as claimed in claim 8, characterized by the following features:
    the electric automobile comprises a direct-current charging socket, and
    the direct-current charging socket is configured to connect the star point to the charging station via a cable.

10. The electric automobile as claimed in claim 8, characterized by the following features:
    the electric automobile has a drive axle, and
    the drive axle carries the three-phase motor.

11. A charging method for an electric automobile as claimed in claim 8, comprising the steps of:
    detecting a fault case, and
    upon detection of the fault case, deactivating at least one switch.

12. The charging method as claimed in claim 11, wherein at least two classes of fault cases are present.

13. The charging method as claimed in claim 11, characterized by the following feature:
    the fault case is present at least when one of the following events occurs;
    the DC link circuit voltage $U_{Batt}$ exceeds a predefined limit value; or
    at least one battery contactor is open.

14. The charging method as claimed in claim 12, characterized by the following feature:
    when the fault case of a first class of fault cases is ended, the charging is continued.

15. The charging method as claimed in claim 12, characterized by the following feature:
    when the fault case of a second class of fault cases is ended, the charging is not continued.

16. The charging method as claimed in claim 15, characterized by the following feature:
    in the fault case of the second class, the discharging is activated.

17. The charging method as claimed in claim 16, wherein a fault case of the second class is detected by hardware.

18. The charging method as claimed in claim 11, characterized by the following feature:
    the interruption of the charging of the traction battery by the switch and preferably continuation of the charging are carried out in accordance with hardware and software rules.

19. The charging method as claimed in claim 11, characterized by the following features:
    upon the interruption of the charging of the traction battery by at least one switch, at least one of the following fault reactions is performed: blocking the switches, activating the discharging, reducing a current excitation via a duty cycle or duty factor of the switches, or adapting the charging requirement to the charging column.

20. The charging method as claimed in claim 11, wherein a fault case is present during the charging process at least when one of the following events occurs:

- the measurement values of at least two current and/or voltage sensors which measure the same variable or are in a fixed mathematical relationship contradict one another by more than a predefined value or a predefined percentage proportion;
- the measurement values of at least one sensor leave a predefined range;
- the measurement values of at least one sensor have a noise proportion above a predefined limit;
- at least one sensor has failed;
- the communication between the charging column and at least one control system of the vehicle has failed;
- the connection of a plug was opened;
- the communication between at least one control system of the inverter and at least one superordinate control system has failed;
- at least one control system of the inverter has not received a signal from a superordinate control system within a predefined time;
- at least one contactor was opened.

* * * * *